United States Patent [19]
Wild et al.

[11] Patent Number: 5,310,806
[45] Date of Patent: May 10, 1994

[54] PROCESS FOR PREPARING AN ETHYLENE-UNSATURATED POLYCARBOXYLIC COMPOUND GRAFT COPOLYMER

[75] Inventors: Leslie Wild, Wyoming, Ohio; Jeffrey A. Jones, Palatine, Ill.

[73] Assignee: Quantum Chemical Corporation, Cincinnati, Ohio

[21] Appl. No.: 703,968

[22] Filed: May 22, 1991

[51] Int. Cl.$^5$ ............... C08F 255/02; C08F 222/06
[52] U.S. Cl. ............................ 525/285; 525/263; 526/272; 106/270; 106/271
[58] Field of Search ........... 525/263, 285, 301, 302, 525/308, 324; 526/272, 318.25, 324, 352

[56] References Cited

U.S. PATENT DOCUMENTS

| | | | |
|---|---|---|---|
| 3,484,403 | 12/1969 | Brunson et al. | 525/183 |
| 4,028,436 | 6/1977 | Bogan et al. | 525/386 |
| 4,315,863 | 2/1982 | Tomoshige et al. | 549/233 |
| 4,358,564 | 11/1982 | Ames | 525/345 |
| 4,506,056 | 3/1985 | Gaylord | 525/265 |
| 4,670,349 | 6/1987 | Nakagawa et al. | 525/222 |
| 4,810,612 | 3/1989 | Ueda et al. | 525/309 |
| 4,888,393 | 12/1989 | Cesare et al. | 526/272 |
| 5,001,197 | 3/1991 | Hendewerk | 525/301 |
| 5,059,658 | 10/1991 | Sezume et al. | 525/285 |

OTHER PUBLICATIONS

Encyclopedia of Polymer Science and Engineering, Wiley & Sons, vol. 6, p. 477 (1986).

Primary Examiner—Vasu S. Jagannathan
Attorney, Agent, or Firm—Gerald A. Baracka; William A. Heidrich

[57] ABSTRACT

A process for preparing an ethylene-unsaturated polycarboxylic graft copolymer is disclosed. In this process an ethylene polymer having terminal double bond functionality is contacted with an unsaturated polycarboxylic compound in the presence of a catalytically effective amount of an organic peroxide.

3 Claims, No Drawings

PROCESS FOR PREPARING AN ETHYLENE-UNSATURATED POLYCARBOXYLIC COMPOUND GRAFT COPOLYMER

BACKGROUND OF THE DISCLOSURE

1. Field of the Invention

Ethylene-unsaturated polycarboxylic compound copolymers, especially ethylene-maleic anhydride copolymers, are employed in coating compositions having a multiplicity of uses. These copolymers, usually graft copolymers, are economically important in that they used as coatings on a whole host of substrates. This is not surprising in that ethylene polymers provide excellent coatability on a great number of substrates. The adhesivity imparted by the unsaturated polycarboxylic compound grafted onto the ethylene polymer provides an excellent bond in holding the uniform coating onto the substrate on which is applied.

A major problem in this art, however, has been the inability in the past to graft a high enough concentration of unsaturated polycarboxylic compound onto the ethylene polymer to provide the desirable level of adhesion and emulsifiability, two properties essential to a good coating. In the prior art, this problem was addressed by grafting an adhesive monomer, i.e., a dicarboxylic unsaturated acid, onto an ethylene polymer in the presence of an organic peroxide which initiates a free radical reaction wherein the unsaturated compound is grafted onto the ethylene polymer. Although this method effectively grafts the unsaturated polycarboxylic compound onto the ethylene polymer, it also catalyzes a secondary, undesirable reaction. That is, the polymeric radicals generated by the decomposition of the peroxide combine to form polymeric crosslinks. As those skilled in the art are aware, the degree of crosslinkage manifests itself in undesirably high gel content. Thus, a dilemma in this art has been the development of ethylene-unsaturated polycarboxylic compound graft copolymers which although possessing the requisite degrees of adhesivity and emulsifiability are also characterized by insufficient degrees of thermoplasticity. That is, undesirable crosslinkage, as manifested by high gel content, in the prior art has been the price paid to obtain the essential level of unsaturated polycarboxylic compound grafted onto an ethylene polymer to provide a desirable coating product.

2. Background of the Prior Art

U.S. Pat. No. 3,236,917 to Natta et al. describes the graft copolymerization of an ethylene-propylene copolymer with maleic anhydride in the presence of an organic peroxide which initiates a graft copolymerization reaction. This reaction deliberately results in a crosslinked polymer. Indeed, crosslinkage is promoted by the presence of a basic compound, such as zinc oxide, which acts a crosslinking catalyst.

U.S. Pat. No. 3,484,403 to Brunson et al. teaches a hot melt coating and adhesive blend of a polyamide and a polyolefin which therebefore could not be blended. The advance in the art of the '403 patent lies in initially modifying the polyolefin by reacting it with an unsaturated dicarboxylic acid or its anhydride. This initial reaction, resulting in the formation of a graft copolymer, involves contact between a polyolefin with an unsaturated dicarboxylic acid or anhydride. This reaction is conducted at elevated temperature in the range of between about 200° C. and 400° C. and in absence of oxygen and a catalyst, such as an organic peroxide.

That the graft copolymer of the '403 patent requires blending with a polyamide to produce a desirable coating or adhesive establishes that the degree of grafting in the absence of an organic peroxide is alone insufficient to provide an acceptable coating or adhesive.

U.S. Pat. No. 3,644,248 to Luijk discloses the addition of maleic anhydride to polyisoprene in the presence of mastication or an organic peroxide. As in the case of U.S. Pat. No. 3,236,917, this reaction is deliberately crosslinked. Indeed, the above reaction is followed by crosslinkage of the elastomer by contact with a divalent Group II or IV metal oxide catalyst.

U.S. Pat. No. 3,884,882 to Caywood, Jr., in an attempt to control crosslinkage, sets forth a process for the formation of a thermoplastic elastomer by the thermal addition of maleic anhydride to elastomeric copolymers of ethylene, at least one $C_3$ to $C_6$ alpha-olefin and at least one nonconjugated diene, typically, the copolymer of ethylene, propylene and at least one non-conjugated diene, commonly referred to as EPDM. The gel content of the thus formed thermoplastic elastomer is less than 5% by weight, based on the total weight of the polymer. This product is characterized by the absence of a free radical generator such as an organic peroxide. However, this product is thereafter cured. Obviously, this product is not used as a coating or adhesive.

U.S. Pat. No. 3,642,722 to Knowles et al. provides a continuous process for producing modified polyolefins, preferably polyethylene, in which a low molecular weight crystallizable polyolefin, formed by thermally degrading a high molecular weight polyolefin, is reacted with an ethylenically unsaturated polycarboxylic compound, preferably maleic anhydride, under plug-type flow conditions in an agitated, multi-staged reactor. In an illustrated embodiment the polyolefin and the polycarboxylic compound are introduced at the bottom of the reaction zone and the desirable graft polymer product is recovered from the top of that zone. Preferably, the reaction rate of this process is accelerated by the use of an organic peroxide, preferably ditertiary butyl peroxide.

U.S. Pat. No. 4,028,436 to Bogan et al. teaches a process for modifying polyethylene waxes to make them emulsifiable. In this process low viscosity polyethylene, prepared by thermal degradation of conventional high molecular weight ethylene homopolymer, is reacted with an organic unsaturated polycarboxylic acid in the presence of a free radical source in the substantial absence of oxygen. The unsaturated polycarboxylic acid may be replaced with an acid anhydride or an acid ester derived therefrom. The absence of oxygen eliminates an important problem associated with such modified polyethylene waxes, their characteristic yellow or orange color.

U.S. Pat. No. 4,376,855 to Ames sets forth a process directed to the modification or grafting of low viscosity polyethylene or ethylene-alpha-olefin copolymer waxes to provide improved physical properties. In the process of the '855 patent a low viscosity ethylene polymer wax is reacted with an unsaturated polycarboxylic compound in the presence of an excessive amount of an organic peroxide, added incrementally during the reaction wherein the weight ratio of unsaturated polycarboxylic component, which is preferably maleic anhydride, to organic peroxide is in the range of between about 1:1 to less than about 5:1. This process is said to substantially eliminate crosslinkage, albeit without the necessity of excluding oxygen from the reaction.

U.S. Pat. No. 4,358,564 to Ames provides a similar process to that disclosed in the Ames '855 patent. In this process a low viscosity ethylene polymer, characterized by less than 0.1% unsaturation, is reacted with an unsaturated polycarboxylic component in the presence of a free radical source, usually an organic peroxide, in a concentration of about 1% to about 10% by weight, based on the weight of the unmodified low viscosity ethylene polymer, and at least one viscosity stabilizer. A particularly preferred class of viscosity stabilizers is recited to be alkyl thiols.

The above discussion of the prior art establishes that although the prior art has proposed a multiplicity of processes to produce graft copolymers of an ethylene polymer and an unsaturated polycarboxylic component, none of them produce the desirable combination of low crosslinkage combined with high carboxylic functionality necessary to provide excellent coating and adhesive properties. Therefore, there is a continuing need in the art for new and better processes to provide this desired modified ethylene polymer.

BRIEF SUMMARY OF THE INVENTION

A new process has now been developed which results not only in the formation of a graft copolymer of an ethylene polymer and an unsaturated polycarboxylic component characterized by high degree of unsaturated polycarboxylic component functionality but also by the absence of significant gelling. This process is furthermore characterized by the absence of the need to exclude oxygen or air from the reactor or the imposition of conducting the reaction under extreme thermodynamic conditions, i.e, elevated temperature and/or pressure.

In accordance with the present invention a process is provided for preparing an ethylene-unsaturated polycarboxylic component graft copolymer which comprises reacting an ethylene polymer characterized by terminal double bond functionality with an unsaturated polycarboxylic compound in the presence of a catalytically effective amount of an organic peroxide to produce the desired graft copolymer.

DETAILED DESCRIPTION

The process of the present invention involves the formation of an ethylene-unsaturated polycarboxylic compound graft copolymer which has desirable properties not found in unmodified ethylene polymers. The ethylene-unsaturated polycarboxylic compound copolymer formed in accordance with the process of this invention is characterized by excellent adhesivity and emulsifiability. Thus, the product of the process of the present invention, an excellent graft copolymer coating having good adhesion to substrates, can be applied from a water-based emulsion.

To produce this desirable polymeric product, an ethylene polymer having terminal double bond functionality is provided. The ethylene polymer may be an ethylene homopolymer or an ethylene copolymer wherein the other comonomer is one or more higher alpha-olefins, vinyl esters or alkyl acrylates. For example, copolymers of ethylene and propylene, ethylene-vinyl acetate copolymers, ethylene-n-butyl acrylate copolymer and the like are particularly preferred, along with polyethylene homopolymers, for use as the ethylene polymer.

It is emphasized that the degree of polymerization of the ethylene polymer having terminal double bond functionality is not critical. Thus, the present invention encompasses low viscosity ethylene polymer waxes, characterized by a viscosity of as low as about 5 centipoises (cp.), as measured by a Brookfield [trademark] viscometer in accordance with ASTM Test Procedure D-1824, to as high as about 40,000 cp. However, low viscosity polymers, such as polyethylene waxes are preferred as the ethylene polymer reactant having terminal double bond functionality. Thus, an ethylene polymer which is a polyethylene wax characterized by a viscosity in the range of between about 100 cp. to about 20,000 cp. is preferred. More preferably, an ethylene polymeric wax characterized by a viscosity in the range of between about 500 cp. and about 5,000 cp. is utilized.

As stated above, unlike many of the processes of the prior art, the process of this invention may also be utilized to modify a high molecular weight ethylene polymer. That is, not only does the present process encompass low viscosity polyethylene waxes but also ethylene homopolymers and copolymers having a melt index in the range of between about 0.1 to about 25 as determined by ASTM Test Procedure D-1238. Similarly, ethylenic polymers of intermediate molecular weight, polymers characterized by a viscosity in the range of between about 40,000 cp and a melt index of not less than about 25, are also within the contemplation of this invention.

The ethylene polymer reactant, used in the process of the present invention, characterized by terminal double bond functionality, is obtained by methods known in the art. For example, such a polymer may be obtained by synthesizing it in a polymerization reaction conducted in the presence of a Phillips catalyst, i.e., a chromium-containing catalyst. Alternatively, such an ethylene polymer may be formed in a high pressure polymerization reaction in the presence of a chain transfer agent, that is, an unsaturated modifier compound. Other methods, known to those skilled in the art, which produce an ethylene polymer having terminal double bond functionality may also be employed.

Independent of the method utilized in obtaining the ethylene polymer having terminal double bond functionality, the polymer is preferably quantifiably defined as a polymer having between about 0.5 to about 6 unsaturated branches per 1,000 carbon atoms in the ethylene polymer chain. More preferably, the ethylene polymer is characterized by between about 0.75 and about 4 unsaturated branches per 1,000 carbon atoms in the ethylene polymer chain. Still more preferably, there are between about 1 and about 3 unsaturated branches per 1,000 carbon atoms in the chain which comprises the ethylene polymer. Even still more preferably, the ethylene polymer includes between about 1.25 and about 2.5 unsaturated branches per 1,000 carbon atoms.

The ethylene polymer having terminal double bond functionality is copolymerized by reaction with an unsaturated polycarboxylic compound. The unsaturated polycarboxylic compound is usually an unsaturated polycarboxylic acid, an unsaturated polycarboxylic anhydride or an unsaturated polycarboxylic ester. Preferably, the unsaturated polycarboxylic compound possesses dicarboxylic functionality.

Among the unsaturated polycarboxylic compounds within the contemplation of this graft copolymerization reaction are maleic acid, maleic anhydride, fumaric acid, citraconic anhydride, itaconic anhydride, dimethyl maleate, dimethyl fumarate, methyl ethyl maleate, dipropyl maleate, dibutyl maleate, monomethyl maleate, monoethyl maleate, monopropyl maleate, mono-2-ethylhexyl maleate and the like. Of these unsaturated polycarboxylic compounds, maleic anhydride is particularly preferred.

The concentration of unsaturated polycarboxylic compound contacted with the ethylene polymer having terminal double bond functionality is in the range of between about 1% and about 15% by weight, based on the weight of the ethylene polymer with which it is contacted. Preferably, the unsaturated polycarboxylic compound is present in an amount of between about 2% and about 10% by weight. More preferably, the unsaturated polycarboxylic compound concentration is in the range of between about 3% and about 6% by weight.

The graft copolymerization reaction occurs in the presence of a catalytically effective amount of an organic peroxide Among the organic peroxides useful in catalyzing the graft copolymerization reaction are 2,5-dimethyl-2,5-di(tert-butylperoxy)hexane, 2,5-dimethyl-2,5-di(tert-butylperoxy)hexyne, ditertiary butyl peroxide, tertiary butyl hydroperoxide, dicumyl peroxide, cumene hydroperoxide, p-methane peroxide, p-methane hydroperoxide and the like. Of these 2,5-dimethyl-2,5-di(tert-butylperoxy)hexane and ditertiary butyl peroxide are preferred.

The catalytically effective amount of an organic peroxide used in the graft copolymerization reaction is in the range of between about 0.01% to about 1.0% by weight, based on the weight of the ethylene polymer contacted with the polycarboxylic compound. Preferably, the concentration of the peroxide is in the range of between about 0.05% to about 0.7% by weight. More preferably, the concentration of the organic peroxide encompasses between about 0.1% and about 0.6% by weight.

The graft copolymerization reaction involving the ethylene polymer and unsaturated polycarboxylic compound reactants and the organic peroxide catalyst preferably occurs in the molten state. That is, the reaction occurs in the liquid state at a temperature at least 10° C. above the melting temperature of the ethylene polymer. This reaction is preferably accompanied by vigorous mixing provided by an extruder or the like.

The following examples are given to illustrate the scope of the present invention. Because these examples are given for illustrative purposes only, the invention should not be limited thereto.

EXAMPLE 1

Peroxide Catalyzed Graft Polymerization of Polyethylene Wax Characterized by Double Bond Functionality and Maleic Anhydride Polyethylene wax characterized by a viscosity of 5,400 cp., as measured by ASTM Test Procedure D-1824, and a terminal double bond functionality of 1.6 unsaturated branches per 1,000 carbon atoms, as determined by ASTM Test Procedure D-3124, was charged into a Warner Pfleiderer [trademark]ZSK-30 twin screw extruder at a rate of 15 lbs/hr. The extruder was operated at 300 revolutions per minute. The extruder provided with heating means was characterized by a temperature profile of its nine heating zones as follows: Zones 1 and 2, 100° C.; Zones 3 and 4, 110° C.; Zones 5 and 6, 225° C.; Zone 7, 200° C.; Zone 8, 150° C.; and Zone 9, 100° C., where the zones are numbered from the upstream to the downstream end of the extruder.

Concurrent with the feeding into the extruder of the polyethylene wax in Zone 1 was the introduction into Zone 3 of the extruder of maleic anhydride at a rate of 0.75 lb/hr (5% w/w) and the introduction of 2,5-dimethyl-2,5-di(tertbutylperoxy)hexane, injected at Zone 4, into the extruder at a rate of 0.075 lb/hr (0.5% w/w). The reaction mixture was devolatilized in Zone 7 at a pressure of 30 mm Hg. The product exiting the extruder was pelletized.

The graft copolymer produced in this reaction was characterized by an acid number of 44.5, as determined by the method described in U.S. Pat. No. 4,376,855, incorporated herein by reference, representative of the grafting onto the ethylene polymer of 3.9% by weight maleic anhydride, based on the total weight of the graft copolymer.

This example is tabulated in Table I.

COMPARATIVE EXAMPLE 1

Graft Polymerization of Polyethylene Wax having Terminal Double Bond Functionality and Maleic Anhydride The same polyethylene wax characterized by terminal double bond functionality provided by 1.6 unsaturated branches per 1,000 carbon atoms and a viscosity of 5,400 cp., was reacted in accordance with the procedure of Example 1. Again, 5% by weight, based on the weight of the polyethylene wax, of maleic anhydride was also fed into the extruder and reacted under the same conditions and duration as were employed in Example 1. Thus, the only distinction between this example and Example 1 was the absence in this example of the peroxide, 2,5-dimethyl-2,5-di(tert-butylperoxy)hexane.

The product of this polymerization reaction was a copolymer of maleic anhydride grafted onto polyethylene wax. The graft copolymer of this example was tested by the procedure used in Example 1 and was found to have an acid number of 14.8, indicating that maleic anhydride was grafted thereon to the extent that it constituted 1.3% by weight of the graft copolymer.

A summary of this example appears in Table I.

COMPARATIVE EXAMPLE 2

Peroxide Catalyzed Graft Polymerization of Polyethylene Wax and Maleic Anhydride Polyethylene wax having a viscosity of 4,850 cp. and containing no measurable terminal unsaturation was reacted with 5% by weight, based on the weight of the polyethylene wax, maleic anhydride and 0.5% by weight, based on the weight of the polyethylene wax, 2,5-dimethyl-2,5-di(tert-butylperoxy)hexane in accordance with the procedure and concentrations utilized in Example 1.

The product of this reaction, which differed from Example 1 by the use of a wax, in this example, which does not possess terminal double bond functionality, was a graft copolymer of polyethylene wax and maleic anhydride characterized by an acid number of 20.5. This indicates that this example resulted in the grafting onto the wax of 1.8% by weight, based on the total weight of the copolymer, maleic anhydride.

A summary of this example appears in Table I.

TABLE I

Effect of Terminal Double Bond and Peroxide on Maleic Anhydride Grafting Levels

| Exam No. | Polymer | Peroxide, %[1] | Maleic Anhydride, %[2] | Maleic Anhydride in Graft Copolymer, % |
|---|---|---|---|---|
| 1 | PE Wax w/Term Db. Bd. | 0.5 | 5 | 3.9 (AN of 44.5) |
| CE1 | PE Wax w/Term Db. Bd. | None | 5 | 1.3 (AN of 14.8) |
| CE2 | Polyethylene Wax | 0.5 | 5 | 1.8 (AN of 20.5) |

[1] Wt. % 2,5-dimethyl-2,5-di(tert-butylperoxy)hexane, based on the weight of the polyethylene wax.
[2] Wt. % of maleic anhydride, based on the weight of the polyethylene wax.

Analysis of the Results Summarized in Table I

A comparison between Example 1 and Comparative Example 1 shows the criticality of including an organic peroxide catalyst in the graft copolymerization reaction. Under otherwise identical conditions maleic anhydride was grafted onto polyethylene wax having terminal double bond functionality in an amount in excess of 200%, as measured by weight, compared to the weight of maleic anhydride grafted onto the polyethylene wax in the absence of the peroxide.

A comparison between Example 1 and Comparative Example 2 establishes the advance in the art provided by the inclusion of terminal bond functionality. The inclusion of terminal bond functionality in the polyethylene wax resulted in more than a doubling of the weight of maleic anhydride grafted onto the wax under identical polymerization conditions.

COMPARATIVE EXAMPLE 3

Peroxide Catalyzed Graft Copolymerization of Polyethylene Wax and Maleic Anhydride A polyethylene wax not possessed of terminal double bond unsaturation having a viscosity of 2,000 cp. was reacted with 5% by weight, based on the weight of the wax, maleic anhydride. This graft copolymerization was conducted in the presence of 0.5% by wt., based on the weight of the wax, 2,5-dimethyl-2,5-di(tert-butylperoxy)hexane. The graft copolymerization reaction was conducted in accordance with the procedure employed in Example 1.

The ethylene-maleic anhydride graft copolymer product obtained in this reaction was characterized by an acid number of 21.7 establishing that 1.9% by weight of the total weight of the graft copolymer was maleic anhydride. The viscosity of the graft copolymer was in excess of 100,000 cp., the maximum reading on the viscometer used in measuring the polymer.

A summary of this example is provided in Table II.

EXAMPLE 2

Peroxide Catalyzed Graft Copolymerization of Polyethylene Wax having Terminal Double Bond Functionality and Maleic Anhydride A polyethylene wax, characterized by a terminal double bond functionality of 1.8 unsaturated branches per 1,000 carbon atoms and a viscosity of 2,400 cp., was contacted with maleic anhydride in accordance with the procedure of Example 1. The maleic anhydride which contacted the polyethylene wax was 5% by weight, based upon the weight of the polyethylene wax. This graft copolymerization reaction was carried out using 0.06% by weight, based on the weight of the polyethylene wax, 2,5-dimethyl-2,5-di(tertbutylperoxy)hexane.

The graft copolymer product of the polyethylene wax-maleic anhydride reaction was analyzed and found to be characterized by an acid number of 22.6 representative of a graft copolymer comprising 2.0 weight percent maleic anhydride. The viscosity of this graft copolymer was found to be 30,000 cp.

A summary of this example appears in Table II.

TABLE II

Comparison of Viscosity of Graft Copolymers Containing Polyethylene Wax With and Without Terminal Double Bond Functionality

| Exam No. | Polymer | Peroxide, %[1] | Maleic Anh., %[2] | MA in Copol., %[3] | Visc., cp. |
|---|---|---|---|---|---|
| CE3 | PE Wax[4] | 0.5 | 5 | 1.9 (AN of 21.7) | >100,000 |
| 2 | Mod. PE Wax[5] | 0.06 | 5 | 2.0 (AN of 22.6) | 30,000 |

Notes:
[1] By weight, based on the weight of the polymer.
[2] By weight, based on the weight of the polymer.
[3] By weight, based on the weight of the copolymer.
[4] Unmodified polyethylene wax having a viscosity of 2,000 cp.
[5] Polyethylene wax with terminal bond functionality (1.8/1,000 carbon atoms) having a viscosity of 2,400 cp.

Analysis of the Results Summarized in Table II

A comparison of Example 2 and Comparative Example 3 establishes that to obtain the same concentration of maleic anhydride grafted onto an ethylene polymer requires a greater concentration of peroxide when the ethylene polymer has essentially no terminal double bond functionality. Greater use of peroxide produces a graft copolymer having significantly increased viscosity, an obvious disadvantageous physical property, especially when the polymer is a coating, such as is usually the case when polyethylene wax is employed.

COMPARATIVE EXAMPLE 4

Graft Copolymerization of a Polyethylene Wax having Terminal Double Bond Functionality and Maleic Anhydride A polyethylene wax having terminal double bond functionality characterized by a terminal double bond functionality of 2.1 unsaturated branches per 1,000 carbon atoms and a viscosity of 700 cp. was graft copolymerized with maleic anhydride in accordance with the procedure of Example 1. The concentration of maleic anhydride charged into the extruder was 5% by weight, based on the weight of the polyethylene wax. However, no peroxide was employed.

The resultant ethylene-maleic anhydride copolymer was analyzed and was found to have an acid number of 20.5, representative of a graft copolymer containing 1.8% maleic anhydride, and a viscosity of 8,000 cp.

Comparative Example 4 is summarized in Table III.

EXAMPLE 3

Peroxide Catalyzed Graft Copolymerization of Polyethylene Wax having Terminal Double Bond Functionality and Maleic Anhydride The same polyethylene wax having terminal double bond functionality used in Comparative Example 4 was again reacted with maleic anhydride utilizing the same weight amounts of the two reactants. However, whereas no peroxide was utilized in Comparative Example 4, 0.14% by weight 2,5-dimethyl-2,5-di(tert-butylperoxy)hexane, based on the weight of the polyethylene wax, was utilized in this example.

The resultant grafted product of this reaction was characterized by an acid number of 41, which indicates that the graft copolymer contained 3.6% by weight maleic anhydride, and a viscosity of 31,000 cp.

This example is tabulated in Table III.

TABLE III

Effect of Peroxide on Grafting Maleic Anhydride onto Polyethylene Wax having Terminal Bond Functionality

| Exam No. | Polymer | Peroxide, % | Maleic Anh., % | MA in Graft Copolymer, % | Visc., cp. |
|---|---|---|---|---|---|
| CE4 | Mod. PE Wax[1] | none | 5 | 1.8 (AN of 20.5) | 8,000 |
| 3 | Mod. PE Wax[1] | 0.14 | 5 | 3.6 (AN of 41) | 31,000 |

Note
[1]Polyethylene wax having terminal double bond functionality (2.1/1,000 carbon atoms) and a viscosity of 700 cp.

Analysis of the Results Summarized in Table 3

A comparison of Example 3 and Comparative Example 4 establishes that the presence of even a minor concentration of peroxide significantly improves the level of grafting when the ethylene polymer is provided with terminal double bond functionality.

The above embodiments and examples are provided to illustrate the scope and spirit of the present invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A process for preparing an ethylene-maleic anhydride graft copolymer comprising contacting a polyethylene wax having a viscosity in the range of between about 100 cp and about 20,000cp and characterized by terminal double bond functionality of between about 1.25 and about 2.5 unsaturated branches per 1,000 carbon atoms with maleic anhydride, present in a concentration of between about 1 wt. % and about 15 wt. %, based upon the weight of said polyethylene wax, in the presence of an organic peroxide, present in a concentration of between about 0.01% and about 1% by weight, based on the weight of the polyethylene wax, said organic peroxide selected from the group consisting of 2,5-dimethyl-2,5-di(tert-butylperoxy)hexane and ditertiarybutyl peroxide.

2. A process in accordance with Claim 1 wherein said maleic anhydride is present in a concentration of between about 3% and about 6% by weight, based on the weight of said polyethylene wax having terminal double bond functionality.

3. A process in accordance with Claim 2 wherein said organic peroxide is present in a concentration of between about 0.1% and about 0.6% by weight, based on the weight of said polyethylene wax having double bond functionality.

* * * * *